(12) United States Patent
Burke et al.

(10) Patent No.: US 12,135,230 B2
(45) Date of Patent: Nov. 5, 2024

(54) PLUMBING CONTROL DEVICE

(71) Applicant: Watts Regulator Co., North Andover, MA (US)

(72) Inventors: Joseph Michael Burke, Deerfield, NH (US); Kyle McGurn, Reading, MA (US); Evan Joseph Sultana, Mansfield, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 18/079,108

(22) Filed: Dec. 12, 2022

(65) Prior Publication Data

US 2023/0116158 A1 Apr. 13, 2023

Related U.S. Application Data

(63) Continuation of application No. 16/634,498, filed as application No. PCT/US2018/043673 on Jul. 25, 2018, now Pat. No. 11,543,278.

(Continued)

(51) Int. Cl.
*G06F 1/00* (2006.01)
*G01D 21/02* (2006.01)
(Continued)

(52) U.S. Cl.
CPC ........... *G01F 15/063* (2013.01); *G01D 21/02* (2013.01); *G06F 1/3209* (2013.01);
(Continued)

(58) Field of Classification Search
CPC ..... G01F 15/063; G01D 21/02; G06F 1/3209; G06F 1/3243; H04W 4/80; H04B 5/0025;
(Continued)

(56) References Cited

U.S. PATENT DOCUMENTS 5,333,785 A * 8/1994 Dodds .................... A01G 25/16
239/69
5,745,049 A 4/1998 Akiyama et al.
(Continued)

FOREIGN PATENT DOCUMENTS

EP 2860596 A2 4/2015

OTHER PUBLICATIONS

International Preliminary Report on Patentability and Written Opinion in corresponding application No. PCT/US2018/043673 dated Feb. 4, 2020.
(Continued)

*Primary Examiner* — Volvick Derose
(74) *Attorney, Agent, or Firm* — Day Pitney LLP; George Chaclas; Anthony A. Kassas

(57) ABSTRACT

A system for remotely measuring the characteristics of water passing through a plumbing control device (PCD) includes a sensor configured to measure characteristics of the water to obtain measured data. The sensor is also linked to a microcontroller of the PCD. An antenna board is linked, and configured to transmit power, to both the microcontroller and the sensor. The antenna board is configured to receive power transmitted from a mobile device and, in turn, transmit power to the microcontroller and the sensor. When power is not being transmitted from the antenna board, the microcontroller and the sensor may be powered off.

31 Claims, 5 Drawing Sheets

Related U.S. Application Data

(60) Provisional application No. 62/539,155, filed on Jul. 31, 2017.

(51) Int. Cl.
    *G01F 15/063*     (2022.01)
    *G06F 1/3209*     (2019.01)
    *G06F 1/3234*     (2019.01)
    *H04W 4/80*     (2018.01)
    *G01F 1/00*     (2022.01)

(52) U.S. Cl.
    CPC ............ *G06F 1/3243* (2013.01); *H04W 4/80* (2018.02); *G01F 1/00* (2013.01)

(58) Field of Classification Search
    CPC ........... G05B 2219/25167; G05B 2219/25354; G05B 19/042; G05B 2219/25428; G05B 2219/31125; G05B 2219/31197; G05B 2219/31211
    USPC .......................................................... 702/45
    See application file for complete search history.

(56) References Cited

U.S. PATENT DOCUMENTS

| | | | |
|---|---|---|---|
| 6,907,300 B2 | 6/2005 | O'Mahoney et al. | |
| 7,380,210 B2 | 5/2008 | Lontka et al. | |
| 7,791,480 B2 | 9/2010 | Skorpik et al. | |
| 8,104,993 B2* | 1/2012 | Hitt ..................... | A01G 25/167 405/37 |
| 8,503,183 B2 | 8/2013 | Hamilton et al. | |
| 9,523,971 B2 | 12/2016 | Durbhaka et al. | |
| 2005/0088299 A1* | 4/2005 | Bandy ................ | G01N 33/0075 340/539.22 |
| 2006/0054214 A1* | 3/2006 | Caamano ............. | A01G 25/167 137/78.3 |
| 2008/0245422 A1* | 10/2008 | McTargett .............. | F16K 31/02 137/487.5 |
| 2008/0281163 A1* | 11/2008 | Peterson ................ | A61B 5/335 600/300 |
| 2011/0035059 A1* | 2/2011 | Ersavas ................ | A01G 25/167 455/466 |
| 2011/0273138 A1* | 11/2011 | Baarman ............ | H02J 7/00034 320/108 |
| 2012/0305096 A1* | 12/2012 | Haller .................... | H01F 38/14 137/15.08 |
| 2013/0190897 A1 | 7/2013 | Junk et al. | |
| 2014/0129036 A1 | 5/2014 | Durbhaka et al. | |
| 2015/0005965 A1* | 1/2015 | Ensworth ................ | G05B 19/18 700/284 |
| 2015/0102940 A1* | 4/2015 | Keech ................ | G05B 19/0423 340/870.02 |
| 2015/0358908 A1* | 12/2015 | Tsukamoto .............. | H04B 5/79 370/311 |
| 2015/0362928 A1 | 12/2015 | Schmidlin et al. | |
| 2016/0356755 A1* | 12/2016 | Gifford .................. | G06Q 50/06 |
| 2019/0313590 A1* | 10/2019 | Wlassich ............. | A01G 25/023 |

OTHER PUBLICATIONS

Partial Supplementary European Search Report for European Patent Application No. 18841642.4 dated Feb. 25, 2021, 13 pages.
EP Communication Pursuant to Article 94(3) in Application No. 18 841 642.4, dated Jan. 17, 2023, 3 pages.

* cited by examiner

PLUMBING CONTROL DEVICE

CROSS REFERENCE TO RELATED APPLICATIONS

This application is a continuation of and claims the benefit of U.S. patent application Ser. No. 16/634,498, filed on Jan. 27, 2020 entitled "PLUMBING CONTROL DEVICE", which claims priority to and benefit of U.S. national phase entry under 35 U.S.C. § 371 of International Application No. PCT/US2018/043673, filed Jul. 25, 2018, entitled "PLUMBING CONTROL DEVICE," which in turn claims priority to U.S. Provisional Patent Application No. 62/539,155 entitled "PLUMBING CONTROL DEVICE" which was filed Jul. 31, 2017, each of which is incorporated herein by reference in their entirety for all purposes.

TECHNICAL FIELD OF THE DISCLOSURE

The present disclosure relates to plumbing control devices ("PCD"), such as water pressure regulating valves and hot water mixing valves for residential and commercial use. More particularly, the present disclosure relates to improved systems and methods of sensing characteristics, such as temperatures and pressures, in water passing through unpowered PCDs and making manual adjustments to the PCDs based on the sensed characteristics.

BACKGROUND OF THE DISCLOSURE

Residential and commercial plumbing systems rely on pipes to transport water and other fluids throughout a home or building. The plumbing system may have a plurality of components, including different types of PCDs, such as pressure regulating valves, hot water mixing valves, and the like. Often, it is helpful to measure various characteristics of the fluid within the system, for example, temperature or pressure.

However, current methods of taking temperature and pressure measurements of water within the plumbing system lack efficiency. For example, thermometers are used to take temperature readings and analog or digital gauges are used to take pressure readings. Unfortunately, thermometers usually require a location, such as a faucet, where water is discharged from the plumbing system to take a measurement. Similarly, pressure gauge readings must be taken from specific locations in the system, such as a valve test cock or tap, where the gauge can be placed in contact with water within the system. These locations can be inconvenient or even impractical to access and are often set apart from areas where adjustments to the PCDs of the system can be made. In addition, these locations are often not accessible to electricity to power the sensors. For example, in a residential plumbing system, pressure and temperature adjustments usually must be made on valves under a sink or in an isolated part of a basement of a house or building, while temperature and pressure measurements can only be taken at various other locations in the building. Thus, making adjustments on the valves, and checking the effects on the water characteristics are often time consuming and difficult.

SUMMARY OF THE DISCLOSURE

In light of the above, the present disclosure provides systems and methods for measuring the characteristics of water in PCDs, such as pressure regulating valves or hot water mixing valves, that are easy to operate and do not require disassembly, or access to the interior, of the PCDs, exposure of the water within the plumbing system, or a source of electrical power. The measured characteristics are also easily transported, stored or transmitted for access at a location where adjustments to the PCDs may be made based upon the measured characteristics. Measured characteristics can include pressure, temperature, and flow rate, for example.

In some exemplary embodiments, the present disclosure provides a system for remotely measuring the characteristics of water passing through a PCD. A sensor is located within the PCD and is configured to measure characteristics of the water to obtain measured data when provided with power. The sensor is linked to an antenna board that is configured to provide power to the sensor. A mobile device, separate from the PCD, is configured to wirelessly locate and transmit power to the antenna board. The antenna board then transmits the power to the sensor which, in turn, measures characteristics of the water to obtain measured data and provides the measured data to the antenna board for transmission to the mobile device. When power is not being transmitted to the antenna board, the sensor is powered off.

In some embodiments, the sensor includes wireless communication capabilities and is configured to transmit the measured data to the mobile device, which then processes the measured data. In another exemplary embodiment, the PCD includes a microcontroller connected to the sensor and the antenna board, and which receives power from the antenna board and the measured data from the sensor. The PCD's microcontroller then processes the measured data before transmitting the processed data through the antenna board to the mobile device.

In some embodiments, the mobile device is a specialized device manufactured to operate in combination with the PCD and configured to store the measured data, process the measure data, and generate an output display based on the processed data. The mobile device can alternatively be a smartphone with a mobile software application so that the measured data can be processed, displayed and stored via the smartphone application. The mobile device can alternatively be a tablet or laptop computer. The PCD's sensors can be configured to measure water temperature, water pressure, water flow rate, and/or combinations thereof.

Further in accordance with the present disclosure, a mobile device is provided with an active NFC device configured to locate, and transmit power to, a passive NFC device of the PCD. As a result, the PCD does not need a battery or connection to a power source. The passive NFC device of the PCD is configured to transmit the power from the active NFC device to the microcontroller and the sensor of the PCD. The passive NFC device then receives the signal from the PCD's microcontroller or sensor and transmits the signal to the active NFC device. In some embodiments, the mobile device contains a processing module configured to convert the signal received by the active NFC device into letters and numbers for a display on the mobile device. In some cases, the mobile device is a smartphone and the active NFC device and the processing module are activated by an application on the smartphone.

In some embodiments, the PCD further includes a battery. The battery is normally disconnected from the PCD's microcontroller and the sensor. The PCD also includes a switch which is activated and connects the battery to the microcontroller and the sensor whenever the passive NFC device of the PCD receives power from an active NFC device.

It should be appreciated that the present disclosure can be implemented and utilized in numerous ways, including without limitation as a process, an apparatus, a system, a device, a method for applications now known and later developed or a computer readable medium. These and other unique features of the present disclosure will become more readily apparent from the following description and the accompanying drawings.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
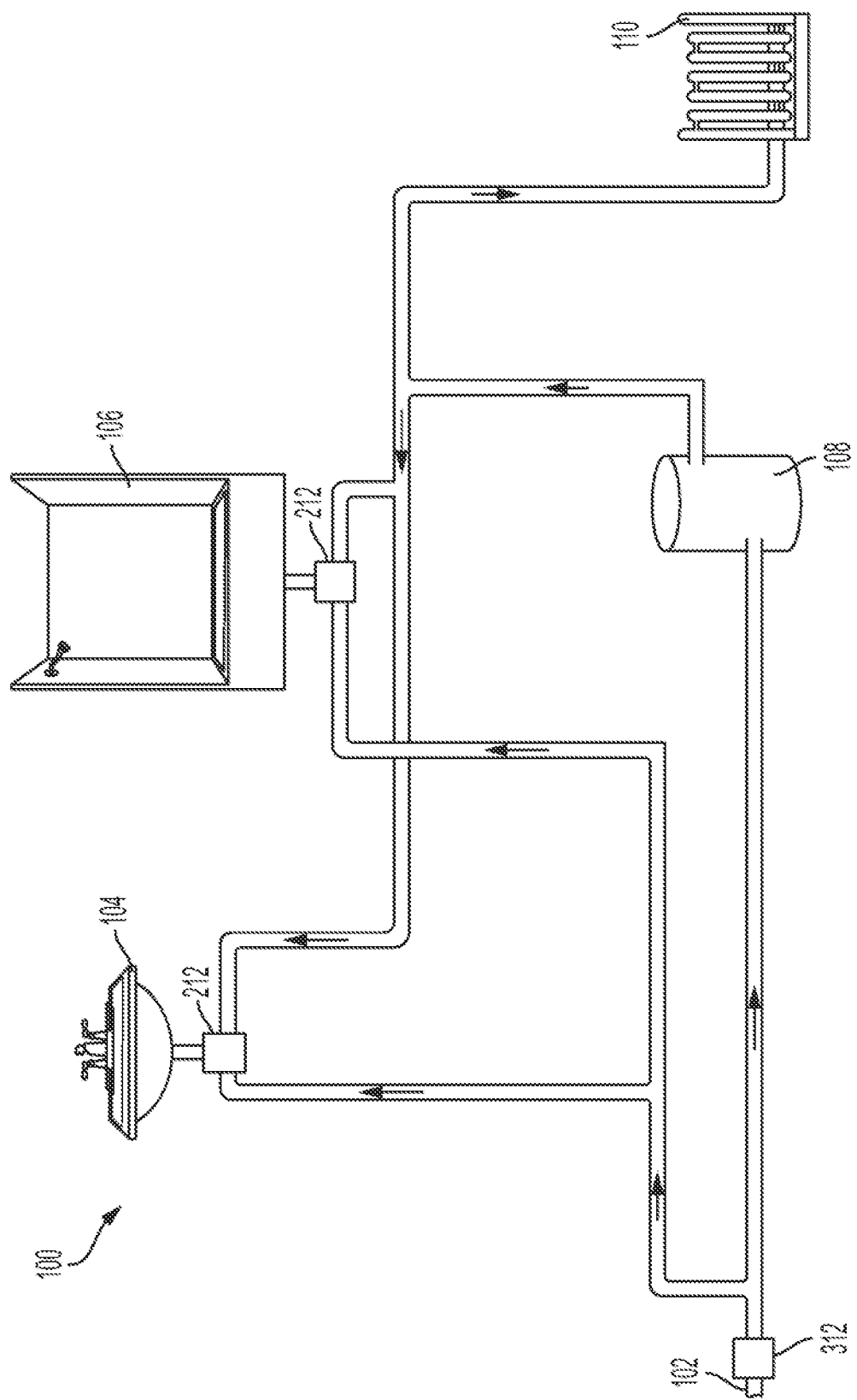
FIG. 1 is a schematic diagram of a residential plumbing system equipped with exemplary embodiments of PCDs constructed in accordance with the present disclosure.

Referring to the figures, exemplary embodiments of new and improved plumbing control devices ("PCDs"), and systems and methods for using the PCDs, according to the present disclosure are shown. It should be noted that the embodiments described below and shown in the drawings are exemplary and are not meant to depict all of the possible applications of the present disclosure.

In depicting the residential plumbing system and components thereof, common items such as conduits, interconnections, filters, check valves, and various other flow valves are omitted from the drawings and discussion for the sake of clarity. The systems and components are shown in their most basic forms to assist in describing the present disclosure. One skilled in the art would understand that a typical residential plumbing system, used in accordance with the subject disclosure, will contain many additional components not depicted herein.

Referring now to FIG. 1, a schematic view of some of the basic components of a typical residential plumbing system are shown generally at 100. A water source 102 provides water to the plumbing system 100 for example, from a municipal water line. Cold water from the water source 102 travels to a sink 104 and a shower 106. Some cold water is also provided to a boiler 108. The boiler 108 heats the water and provides hot water to the sink 104, shower 106, and a radiator 110.

In general, the present disclosure relies on NFC in a system such as the residential water system 100 to collect data from sensors and, at times, manually adjust PCDs 212, 312 accordingly. NFC is a type of radio frequency identification (RFID) that relies on electromagnetic fields to allow one device to locate and communicate with another device. An NFC system requires at least one active device which seeks out one or more passive devices. In some embodiments, an NFC system may include one or more additional active devices (either in addition to, or used in conjunction with the passive devices). The active components within the NFC system seek out other devices within the system and are able to transmit and/or receive data from the other devices.

Particularly, when an active device is in placed in close proximity of another device within the NFC system (e.g., closer than five centimeters), an electromagnetic field of the active device allows the active device to locate the other device (i.e. the passive device) to transmit and/or receive data. In addition, in some cases, an active device is also able to transmit power to the other devices in the NFC system. For example, a smartphone can be used as an active device and can transmit power through an antenna board to power another device (such as a circuit board). By contrast, passive devices (i.e. the aforementioned antenna board), typically do not actively seek out other devices within the system. Instead, the passive devices are capable of receiving and storing data, and then transmitting that data to an active device once the active device has conic in range and located the passive device. Accordingly, in the example described above, once the smartphone transmits power to the antenna board, the circuit board can then transmit data to the antenna board which, in turn, transmits the data to the active NFC device.

Figure 2A:
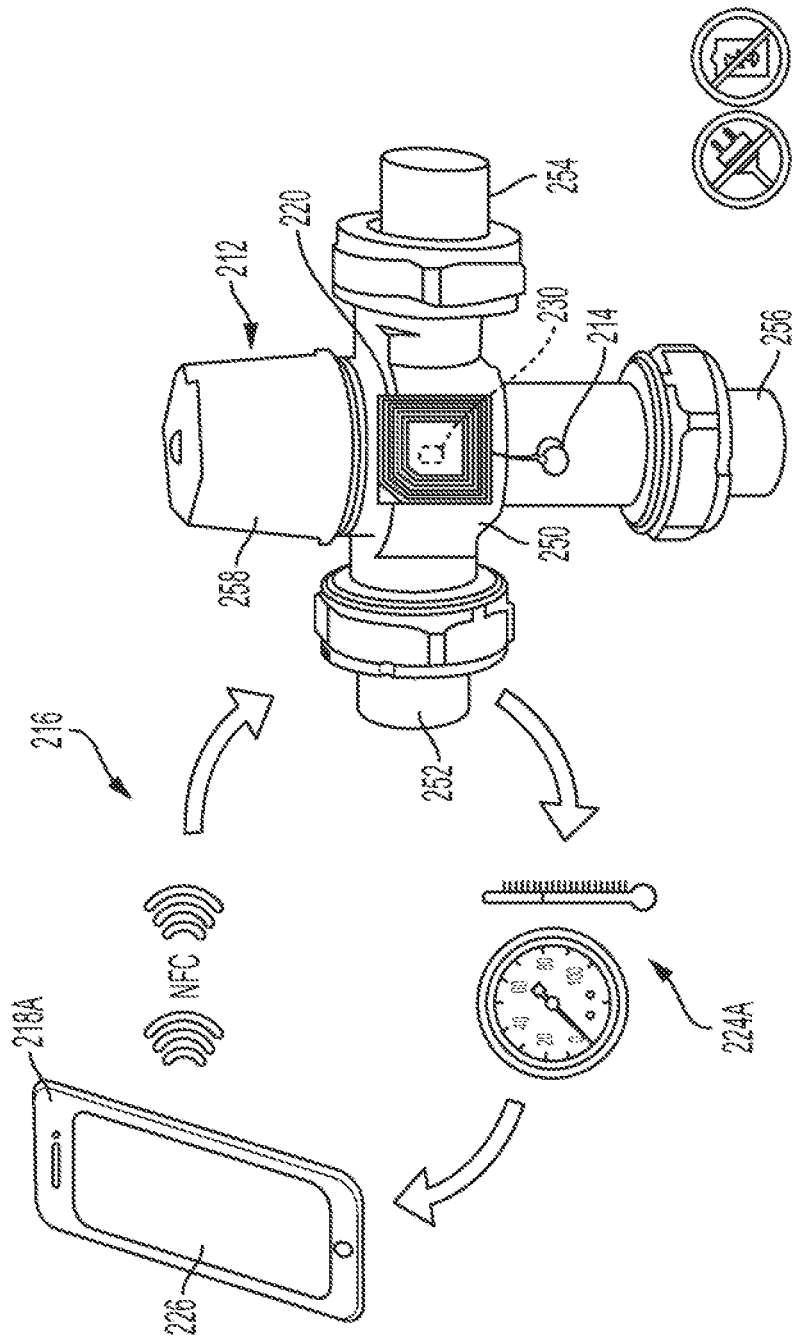
FIG. 2A is a schematic overview of an exemplary embodiment of a PCD constructed in accordance with the present disclosure.

Referring now to FIG. 2A, a simplified schematic overview of an exemplary embodiment of an NFC system in accordance with the present disclosure is shown generally at 216. The system 216 includes a smartphone 218A which acts as an active NFC device and a transponder 220 which acts as a passive NFC device. The transponder 220 is attached to a PCD comprising a hot water mixing valve 212 which, in operation, is connected to a residential water system and used to temper hot water for use in showers and faucets.

An example of a hot water mixing valve 212 for use in the system is the Watts LF1170 mixing valve. The valve 212 includes a body 250 defining an interior passageway (not shown) connecting a hot water inlet 252, a cold water inlet 254, and a mixed water outlet 256. The inlets 252, 254 and outlet 256 are used to connect the valve 212 to the plumbing system. The valve also includes a manually adjustable handle 258 for adjusting the amounts of cold and hot water to be mixed and the temperature of the mixed water that exits the valve. During installation of the valve 212 in a plumbing system, or adjustment thereafter, a plumber will use the handle 258 to adjust water mixing and obtain the desired mixed water temperature.

Within the interior of the valve 212, and in contact with the mixed water portion of the interior passageway of the valve 212 is at least one sensor 214 that is linked, for example via hardwire, to the transponder 220. An example of a sensor suitable for this application is an MS5837-30BA temperature and pressure sensor available from TE Connectivity Corporation. The sensor 214, which may extend through an opening in the body 250, is used to measure the temperature and pressure of the mixed water near the mixed water outlet 256. Additional sensors may also be placed in the inlet 254 and the outlet 256 to monitor inlet temperatures. And the sensors may comprise a temperature sensor, a pressure sensor, a flow rate sensor, etc., or combinations thereof. The valve 212 further includes a microcontroller 230 connected to the transponder 220 and the sensor 214

Although the transponder 220, the microcontroller 230 and the sensor 214 are shown assembled to the body 250, such that they are part of the valve 212, these components could be provided separate from the valve. For example, the components 214, 230, 220 could be assembled to a short length of metal tubing that can be connected to the outlet 256 of the valve 212, by screw threads for example, and act as an optional accessory, which can be purchased with the valve.

When the smartphone 218A is placed in close proximity (i.e. a few centimeters away) to the transponder 220, data 224A from the sensor 214, in this embodiment representing measured temperature and pressure of the mixed water within the valve 212 is returned to the smartphone 218A. In FIG. 2A, the measured data 224A of pressure and temperature is symbolically represented by a gauge dial and a thermometer. It should be noted that alternative or additional types of sensors can be included. For example, a flow rate sensor could also be included in the valve 212.

In some cases, prior to the smartphone 218A forming an NFC link, the sensor 214 can be maintained in an "off" position to conserve energy. In that case, the smartphone 218A also serves to power the sensor 214 to allow the sensor to collect the data 224A which the transponder 220 then provides to the smartphone 218A. However, it should be noted that in some embodiments, the NFC connection can be used for data transmission only (as opposed to data transmission and power). In that case, a battery, or a switch connected to a power source, can be activated once the active NFC device comes in range to provide power to the microcontroller 230 or sensors 214 as needed. An application on the smartphone 218A then collects and stores the data 224A. Further, the application creates a display on an output screen 226, using the stored data, to inform the user of the pressure and temperature of water within the valve 212.

Figure 2B:
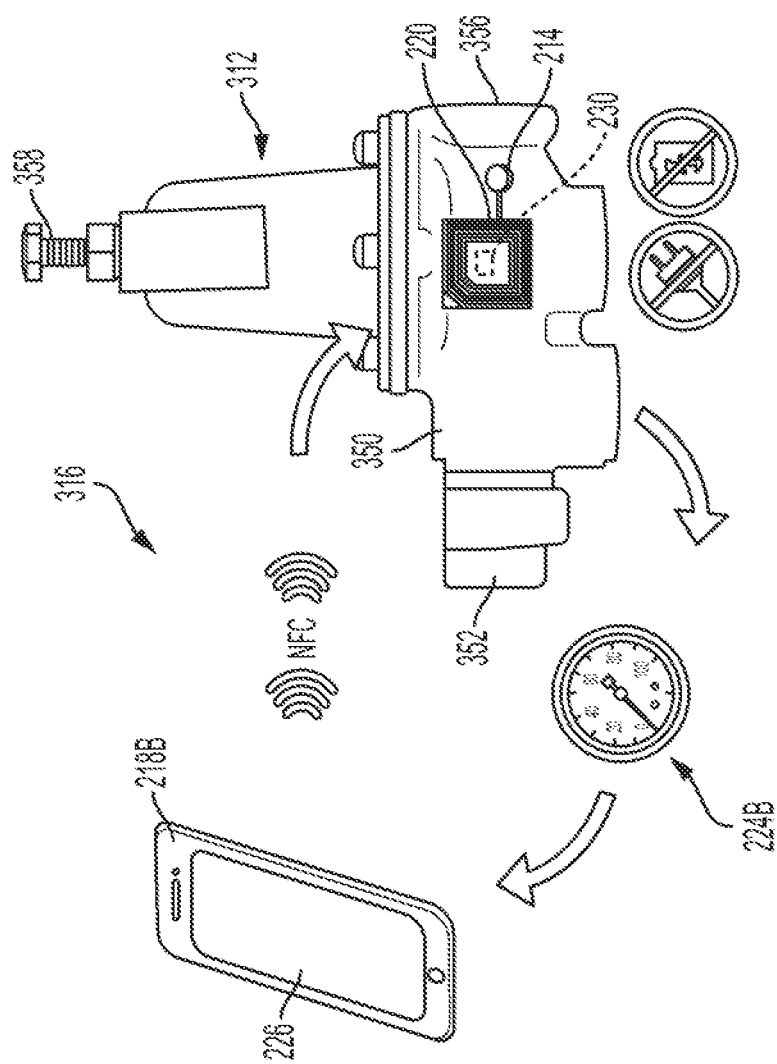
FIG. 2B is a schematic overview of another exemplary embodiment of a PCD constructed in accordance with the present disclosure.

Referring now to FIG. 2B, another simplified schematic overview of a system employing NFC in accordance with the present disclosure is shown generally at 316. The system 316 is similar to the system 216 so like reference numerals are used to refer to similar components. The following description is directed to the differences between the systems 216, 316. The system 316 includes a specialized controller 218B which acts as an active NFC device for interaction with the transponder 220. The transponder 220 is attached to a PCD comprising a pressure regulating valve 312.

An example of a pressure regulating valve 312 is the Watts LF25AUB-Z3 pressure regulating valve. The valve 312 includes a body 350 defining an interior passageway (not shown) connecting a water inlet 352 and a water outlet 356. The inlet 352 and the outlet 356 are used to connect the valve 312 to the plumbing system. The valve 312 also includes a manually adjustable handle 358 for adjusting the pressure of the water that exits the outlet 356. During installation of the valve 312 in a plumbing system, or adjustment thereafter, a plumber will use the handle 358 to obtain the desired water pressure.

Within the interior of the valve 312, and in contact with the interior passageway of the valve 312 is a temperature and pressure sensor 214 that is linked, for example via hardwire, to the transponder 220. A suitable sensor is the MS5837-30BA temperature and pressure sensor available from TE Connectivity Corporation. The sensor 214, which may extend through a hole in the body 350, is used to measure the pressure of the water near the outlet 356. In this particular embodiment, only the pressure data produced by the sensor 214 is used. The temperature data is not used. An additional sensor may be placed in the inlet 352 to monitor inlet pressure. When the specialized controller 218B is placed in close proximity (i.e., a few centimeters away) to the transponder 220, data 224B from the sensor 214 representing measured pressure of water from the valve 312 is passed to the specialized controller 218B. In FIG. 2B, the data 224B of pressure data is symbolically represented by a gauge dial. The specialized controller 218B is adapted and configured to process the data and present information to the user on the display 226. The specialized controller 218B includes storage (e.g., memory such as RAM, ROM etc.) and processing capacity (e.g., a microprocessor) as needed.

Figure 3:
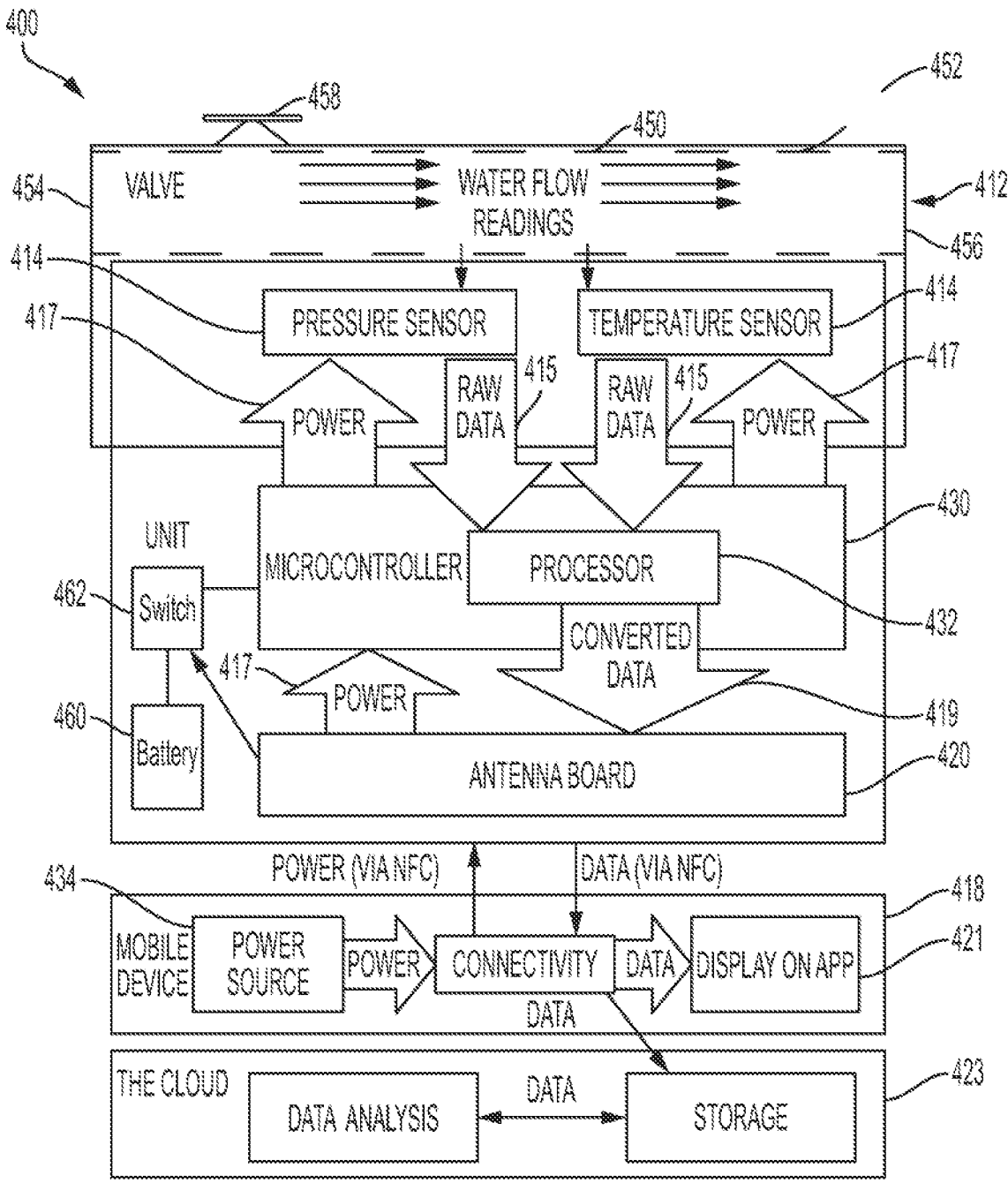
FIG. 3 is a block diagram of an exemplary embodiment of a system in accordance with the present disclosure.

Referring now to FIG. 3, a schematic overview of an exemplary embodiment of an NFC system 400 in accordance with the present disclosure is shown. The NFC system 400 includes a PCD 412, such as a valve, and a portable controller 418, such as a specialized control module, a mobile phone, tablet, laptop or the like. In general, the NFC system 400 serves to generate a display on the portable controller 418 showing characteristics (i.e. temperature, pressure, flow rate) of water flowing through the PCD 412. The PCD 412 includes sensors 414 that measure the characteristics of the water to obtain measured data 415 (i.e. raw data). The PCD also includes an antenna board 420 and a microcontroller 430 operatively connected to the sensors 414, for example by being linked thereto via a wired connection.

The PCD 412 includes a body 450 defining an interior passageway 452 connecting a water inlet 454 and a water outlet 456. The inlet 454 and the outlet 456 are used to connect the PCD 412 to a plumbing system. The PCD 412 also includes a manually adjustable handle 458 for adjusting the PCD so that characteristics of the water that exits the outlet 456 are controlled. During installation of the PCD 412 in a plumbing system, or adjustment thereafter, a plumber will use the handle 458 to obtain the desired water characteristic, such as temperature, pressure, or flow rate. In the system 400, the portable controller 418 acts as an active NFC device. In various embodiments, the antenna board 420, the microcontroller 430, and the sensors 414 can act as passive NFC devices. The antenna board 420, microcontroller 430, and sensors 414 are typically in an "off" position until an active NFC device, such as the portable controller 418, is brought within close proximity. When the portable controller 418 is brought within close proximity to the passive NFC device (i.e. a passive NFC transponder), power is provided to the other components of the system 400. For example, when the antenna board 420 is serving as a passive NFC device for the system 400, bringing the portable controller 418 within close proximity of the antenna board 420 allows the portable controller 418 to locate and provide power to the antenna board 420. The portable controller 418 has a power source 434 such as a battery to provide both power for the portable controller and passive NFC devices.

The PCD 412, however, may also include a battery 460 connected through a normally open switch 462 to the microcontroller 430 and/or the sensors 414. The switch 462 is also connected to the antenna board 420 constructed to close, and create an electrical connection between the battery 460 and the sensors 414 and the microcontroller 430, upon receiving power from the antenna board 420. In an exemplary embodiment, the antenna board 420 provides power to the switch whenever the portable controller 418 is brought within close proximity. The battery 460 can be used to supplement the wireless power provided by the portable controller 418. Since the battery 460 is only used when the portable controller 418 is brought within close proximity, it is anticipated that they battery should maintain power for an extended period, such as for the life of the PCD 412. The switch 462 may comprise a MOSFET, or other suitable transistor, that requires very little input current to control the battery 460.

The antenna board 420 has a wired connection to the microcontroller 430, which in turn is wired to the sensors 414. In this way, the antenna board 420 is linked to the microcontroller 430 which is linked to the sensors 414. The portable controller 418 then transmits power to the antenna board 420 which transmits power 417 to the microcontroller 430 and sensors 414. Notably, in some embodiments, the microcontroller 430 is not a separate and distinct component from the sensors 414, but rather, one or more microcontrollers 430 are included as a part of the sensors 414. In addition to memory for storage (not shown), the microcontroller 430 includes one or more processors 432 to perform logical operations and other necessary functions.

Once power 417 is provided to the sensors 414, the sensors 414 turn on and begin measuring characteristics of the water to obtain measured data 415. For example, the sensors 414 can include a pressure sensor that takes readings of water pressure and a temperature sensor that takes temperature readings of the water. Notably, other types of sensors such as flowmeters may be used and various types of sensors capable of measuring data related to water and water flow, as are known in the art, may be employed for the present disclosure to be effective. It is envisioned that the sensors 414 may include combination pressure, temperature, flow rate sensors, or the like, as desired. In other embodiments, the fluid network is not for water but rather a network for a different fluid, which requires monitoring and adjustment.

In some embodiments, the sensors 414 have wireless capability such as the ability to communicate via a Bluetooth system. Therefore, after the sensors 414 obtain measured data 415, the sensors 414 can communicate directly with the portable controller 418, transferring the measured data 415 to the portable controller 418 for processing, storage, and display. In other cases, such as when the antenna board 420 is acting as a passive NFC device, the sensors 414 provide the measured data 415 to the microcontroller 430 which then processes the data to create a signal 419 which can be transmitted via NFC. The signal 419 is transmitted to the antenna board 420 which then transmits the signal 419, via NFC, to the mobile computer 418.

In some cases, the portable controller 418 further contains a processing module which converts the signal into letters, numbers, and other recognizable graphics to create a display for an output screen 421 of the portable controller 418. For example, the portable controller 418 can be a smartphone and the processing module is an application on the smartphone. The application then generates a display for the output screen 421 using the signal 419 which helps the user quickly glean relevant information from the measured data 415. For example, the application can generate a display indicating an approximate location of the relevant PCD 412 from which the measurements were taken, the time and/or date on which the measurements were taken, and values associated with the measured data 415 (i.e., the temperature or pressure of the water). The portable controller 418 can then store the data for future access such as in an internal memory bank. Additionally, or alternatively, the portable controller 418 can be configured to upload the data to a remote location, such as a computing network or cloud 423, where the data can be stored and/or further analyzed. It is anticipated that other information may be collected from the system, including the model and serial numbers of the PCD, the location of the PCD, and the name of the installer, for example. Such information can, in turn, be used to register the PCD for warranty coverage and notify the owner of any product recalls, for example. The system may also be used to download information, such as assembly drawings and installation instructions, from the cloud 423 to the controller 418.

Figure 4:
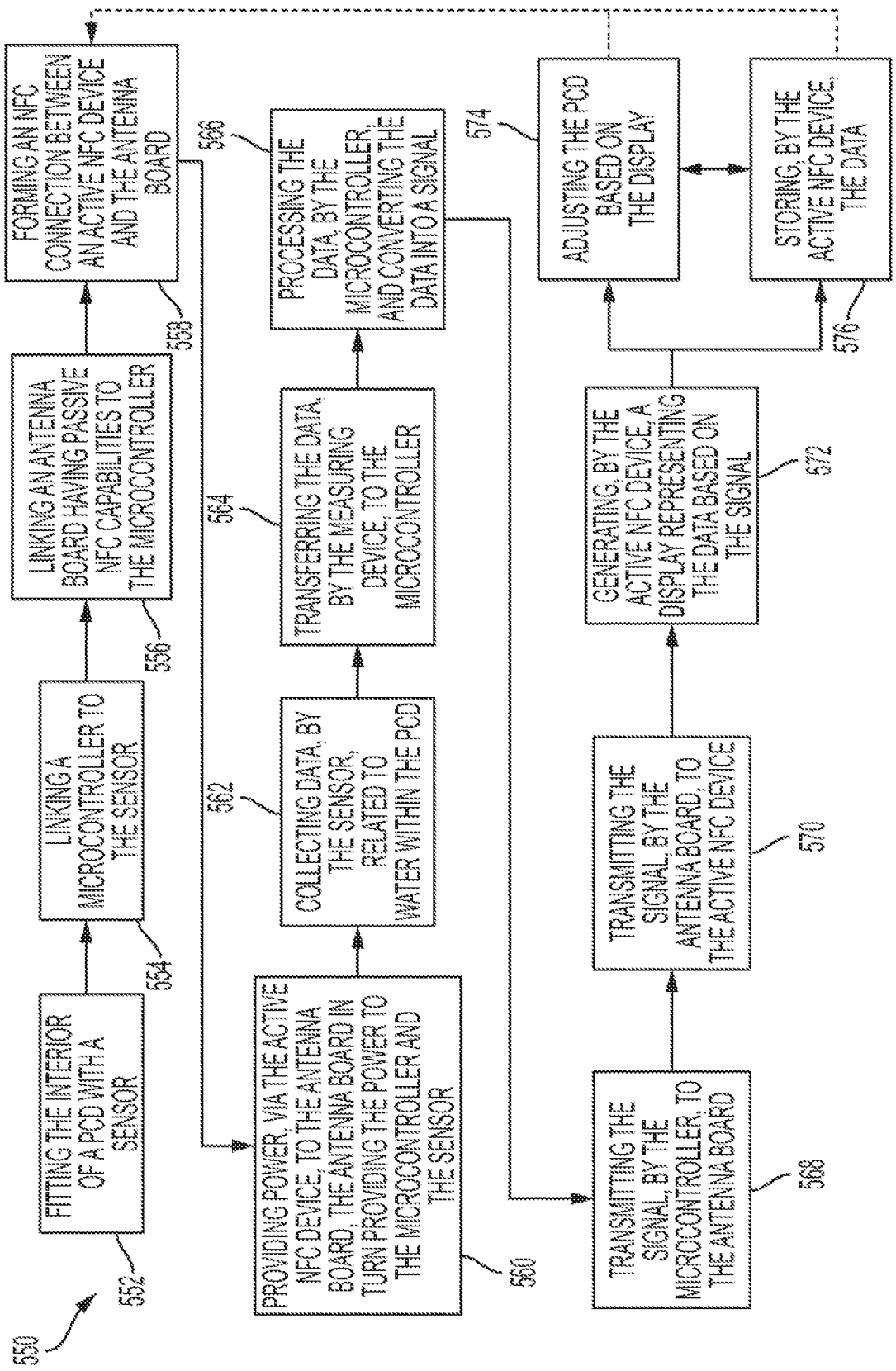
FIG. 4 is a flowchart illustrating an exemplary embodiment of a method in accordance with the present disclosure.

Referring now to FIG. 4, a flowchart showing a method 550 of remotely measuring characteristics of water passing through a PCD is shown. The method 550 can be carried out in a plumbing system using PCDs and the other components discussed above and shown in FIGS. 1-3, for example.

Still referring to FIG. 4, the method 550 begins, at step 552, with the step of fitting the interior of a PCD with a sensor. In the example embodiment, the sensor is placed within the interior of a PCD within a water pipe. A microcontroller is then linked to the sensor at step 554. Further, at step 556, an antenna board having passive NFC capabilities is linked to the microcontroller. Typically, the microcontroller is capable of processing data and transmitting signals and power between the sensor and the antenna board. At step 558, an active NFC device locates the antenna board using NFC technology and establishes a connection with the antenna board.

At step 560, the active NFC device provides power to the antenna board. This allows the antenna board to provide power to the microcontroller and the sensor, turning the microcontroller and sensor "on." Having been turned on, the sensor begins collecting data related to water within the PCD at step 562. As the measured data is collected, the data is transferred, at step 564, to the microcontroller.

At step 566, the microcontroller processes the data and coverts the data into a signal which can be used to more easily transmit the data. The signal is then transmitted, by the microcontroller, to the antenna board at step 568. At step 570, the antenna board transmits the signal to the active NFC device. The signal represents the data collected by the measurement device related to water within the PCD. For example, the signal can contain information regarding characteristics of the water such as temperature, pressure, flow rate, or the time and location that the measurements were taken. Therefore after receiving the signal, the active NFC device can generate a display which depicts the data in a user friendly setting at step 572. For example, in some embodiments, the active NFC device is a specialized device and the display is generated on an output screen by an application on the specialized device. The display provides a quick and effective means to analyze the water within the PCD which can then be used for various purposes. For example, the display can be relied upon to effectively operate and adjust a residential water system 100 (See FIG. 1).

Referring now to FIGS. 1 and 4, the information shown on the display can be used to adjust the valves of the residential water system 100. For example, the PCD 212 that is proximate to the sink 104 could be linked to an antenna board which serves as a passive NFC device and a microcontroller. When the active NFC device moves within NFC range of the antenna board, the PCD 212 is powered on and begins taking one or more pressure readings of the water in accordance with the steps of the method 550 described above. The user then looks at the final display on their smartphone to see the measured characteristics of the water at that location. For example, if the PCD 212 included a pressure sensor, the display might show pressure of the water at that location. Then, at step 574 of the method 550, the user can make an adjustment to the corresponding PCD 212, throttling or opening the PCD 212 to allow more or less water through the cold water line and to the sink 104 as desired, for example. Upon reading the data from the display, the user may adjust the flow of fluid through the PCD 212 using a manual or other adjustment mechanism of the PCD 212 if a parameter is not equal to a desired characteristic. The parameter may be set to an desired value with a specified range.

Additionally or alternatively, at step 576 the data can be stored in memory for later access. In some cases, the stored data can also be uploaded to a cloud storage location. Steps 558 through 572 can then be repeated, as desired, with respect to the other PCDs 212, 312 within the system 100. Similarly, steps 574 and 576 may also be carried out after, or just before, step 572.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, elements that serve a distinct function (i.e., electronics, sensors, microcontrollers, antennas and the like) shown as distinct for purposes of illustration may be incorporated within other functional elements in a particular implementation. In different embodiments, the steps of the method and system described above may also be carried out in a different order, or with additional steps then shown above.

While the present disclosure has been described with respect to preferred embodiments, those skilled in the art will readily appreciate that various changes and/or modifications can be made to the present disclosure without departing from the spirit or scope of the present disclosure. For example, each claim may depend from any or all claims in a multiple dependent manner even though such has not been originally claimed. It is also envisioned that the PCD may contain limited components, which are normally off. The limited components may be activated by placement of an antenna board and power source assembly nearby. In addition to activating the PCD sensors and/or other components, the antenna board and power source assembly may relay the PCD data to a specialized controller so that a user may perform adjustments remotely from the location of the PCD or antenna board and power source assembly.

The present disclosure, therefore, provides a new and improved fluid system. It should be understood, however, that the exemplary embodiments described in this specification has been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the mixing valve disclosed herein, and all elements thereof, are contained within the scope of at least one of the following claims. No elements of the presently disclosed technology are meant to be disclaimed.

What is claimed is:

1. A system for controlling a fluid passing therethrough, the system comprising:
    a plumbing control devices ("PCD") configured to have fluid pass therethrough and modify the fluid passing therethrough using an adjustment feature;
    at least one sensor coupled to the PCD and configured to generate a first signal indicative of at least one characteristic of the fluid;
    a microcontroller linked to the at least one sensor for controlling operation of and providing power to the at least one sensor;
    an antenna board linked to the microcontroller and configured to:
        selectively provide power to the microcontroller;
        wirelessly receive power from a mobile device, separate from the PCD for transmission of power to the microcontroller; and
        receive the first signal and send at least a second signal to the mobile device based on the first signal; and
    a battery connected to the microcontroller and the at least one sensor through a switch, wherein the switch is configured to have a normally off position in which no power from the battery is drawn and an on-position that creates an electrical connection between the battery and the microcontroller to supply power to the microcontroller,
    wherein:
    the mobile device is configured to generate an output display based on the second signal in real-time to allow evaluating the at least one characteristic to properly set the adjustment feature of the PCD for a desired value of the at least one characteristic;
    the microcontroller and the at least one sensor are powered off when power is not being transmitted from the antenna board; and
    the switch is only set to the on-position when the antenna board comes in range of the microcontroller.

2. The system of claim 1, wherein a dedicated power source associated with the at least one sensor and the microcontroller is not required.

3. The system of claim 1, wherein the PCD is a pressure regulating valve and the at least one characteristic is pressure output by the pressure regulating valve.

4. The system of claim 1, wherein the at least one sensor is provided in a kit to be deployed in a conduit coupled downstream from the PCD as a retrofit.

5. The system of claim 1, wherein the PCD is a hot water mixing valve and the at least one characteristic is temperature of the fluid output by the hot water mixing valve.

6. The system of claim 1, wherein the mobile device locates the antenna board when placed in close proximity thereto.

7. The system of claim 1, wherein the microcontroller includes memory for storing PCD data related to the PCD, the PCD data being selected from the group consisting of: a model number; a serial number; a location, a name of a person; and combinations thereof, and wherein the second signal includes at least one portion of the PCD data, which can be displayed on the mobile device.

8. The system of claim 1, wherein the adjustment feature of the PCD is operated remotely.

9. The system of claim 1, wherein the antenna board of the PCD wirelessly receives power from the mobile device by near field communication.

10. A system for evaluating and adjusting a characteristic of fluid passing through a plumbing control device ("PCD") comprising:
    an adjustment mechanism;
    a sensor configured to measure the characteristic of the fluid flowing through the PCD to obtain measured data when the sensor is activated, wherein the sensor is normally deactivated;
    a passive transponder operatively connected to the sensor and configured to:
        selectively provide power to the sensor;
        receive the measured data from the sensor; and
        wirelessly transmit the measured data;

a mobile device including: an active transponder; a display screen; a microcontroller operatively connected to the active transponder and the display screen; and a computer program loaded on the microcontroller and configured to:
establish a wireless data link with the passive transponder upon being located in close proximity to the passive transponder;
wirelessly receive the measured data from the passive transponder;
process the measured data; and
display the processed measured data on the display screen for review and, in turn, evaluation of the characteristic so that the fluid exiting the PCD is modified using the adjustment mechanism if the processed measured data from the display screen indicates that the characteristic of the fluid is not equal to a desired setting.

11. The system of claim 10, wherein the computer program of the mobile device is activated when the mobile device is placed near the PCD.

12. The system of claim 10, wherein the adjustment mechanism of the PCD is a manual adjustment mechanism.

13. The system of claim 10, wherein the mobile device is a smartphone having a mobile software application, the measured data is processed via the mobile software application, and after processing, the measured data is displayed and stored via the mobile software application.

14. The system of claim 10, wherein the sensor is configured to measure at least one characteristic selected from the group consisting of: water temperature; water pressure; water flow rate through the PCD; and combinations thereof.

15. The system of claim 1, wherein the at least one sensor is in contact with the fluid passing through the PCD.

16. The system of claim 1, wherein the at least one sensor is: a first sensor; and a second sensor coupled to the PCD.

17. The system of claim 16, wherein the first sensor is configured to generate a signal indicative of at least one characteristic of the fluid located at an inlet of the PCD and the second sensor is configured to generate a signal indicative of at least one characteristic of the fluid located at an outlet of the PCD.

18. The system of claim 16, further comprising:
a second microcontroller linked to the second sensor for controlling operation of and providing power to the second sensor; and
a second antenna board linked to the second microcontroller and configured to:
provide power to the second microcontroller; and
wirelessly receive power from the mobile device.

19. A plumbing control devices ("PCD") configured to have fluid pass therethrough, comprising:
an adjustment mechanism for modifying the passage of fluid therethrough;
at least one sensor configured to generate a signal indicative of at least one characteristic of the fluid;
a microcontroller linked to the sensor for controlling operation of and providing power to the sensor;
an antenna board linked to the microcontroller and configured to:
provide power to the microcontroller;
wirelessly receive power from a mobile device, separate from the PCD, for transmission of power to the microcontroller; and
receive the signal from the sensor and wirelessly transfer the signal to the mobile device so that the at least one characteristic of the fluid can be displayed on the mobile device; and
a battery connected to the microcontroller and the at least one sensor through a switch, wherein the switch is configured to have a normally off position in which no power from the battery is drawn and an on-position that creates an electrical connection between the battery and the microcontroller to supply power to the microcontroller,
wherein the adjustment mechanism of the PCD can be adjusted based on the at least one characteristic of the fluid displayed on the mobile device.

20. The PCD of claim 19, wherein a dedicated power source associated with the sensor and the microcontroller is not required.

21. The PCD of claim 19, wherein the microcontroller and the sensor are powered off when power is not transmitted from the antenna board.

22. The PCD of claim 19, further comprising a battery connected to the microcontroller.

23. The PCD of claim 22, wherein the battery is connected to the microcontroller through a switch configured to have a normally off position and an on position that creates an electrical connection between the battery and the microcontroller to supply power to the microcontroller.

24. The PCD of claim 23, wherein the antenna board is configured to put the switch in the on position when the antenna board receives power from the mobile device.

25. The PCD of claim 19, wherein the PCD is a pressure regulating valve and the at least one characteristic is pressure output by the pressure regulating valve.

26. The PCD of claim 19, wherein the sensor is deployed on a conduit coupled to the PCD.

27. The PCD of claim 19, wherein the PCD is a hot water mixing valve and the at least one characteristic is temperature of the fluid output by the hot water mixing valve.

28. The PCD of claim 19, wherein the microcontroller includes memory for storing PCD data related to the PCD, the PCD data being selected from the group consisting of: a model number; a serial number; a location, a name of a person; and combinations thereof, and wherein the antenna board is adapted to wirelessly transfer at least one portion of the PCD data to the mobile device.

29. The PCD of claim 19, wherein the adjustment mechanism is a manually adjustable handle.

30. The PCD of claim 19, further comprising a mobile software application for installation on the mobile device, for displaying at least one characteristic of the fluid on the mobile device.

31. The PCD of claim 19, wherein the sensor extends into an interior passageway of the PCD to physically contact the fluid.

* * * * *